United States Patent
Dumas

[15] 3,650,424
[45] Mar. 21, 1972

[54] PICKUP TRUCK SPARE TIRE CARRIER

[72] Inventor: Hugh D. Dumas, Box 1121, Havre, Mont. 59501

[22] Filed: Dec. 19, 1969

[21] Appl. No.: 886,456

[52] U.S. Cl. .......................................................... 214/454
[51] Int. Cl. ............................................................. B62d 43/00
[58] Field of Search ............. 108/6; 214/450, 451, 452, 453, 214/454

[56] References Cited

UNITED STATES PATENTS

| 3,494,493 | 2/1970 | Fowler | 214/454 |
| 3,428,200 | 2/1969 | Graves et al. | 214/454 |
| 2,679,961 | 6/1954 | Brewer | 214/454 |
| 2,936,918 | 5/1960 | Vais | 214/454 |
| 1,913,835 | 6/1933 | Golike | 214/454 |

FOREIGN PATENTS OR APPLICATIONS

| 988,712 | 5/1951 | France | 214/454 |

Primary Examiner—Gerald M. Forlenza
Assistant Examiner—John Mannix
Attorney—Clarence A. O'Brien and Harvey B. Jacobson

[57] ABSTRACT

An underslung spare tire carrier for a pickup truck structurally designed and adapted to take the spare tire out of the box-type body and suspend it under the bed or bottom of the box where it can be conveniently unlatched and readily removed for use. No tools, special or otherwise, are needed. A yieldable rack cradles and clampingly stores the tire. This rack is hinged and the rearward end is freed when unlatched, swings down and unloads the tire at will.

4 Claims, 4 Drawing Figures

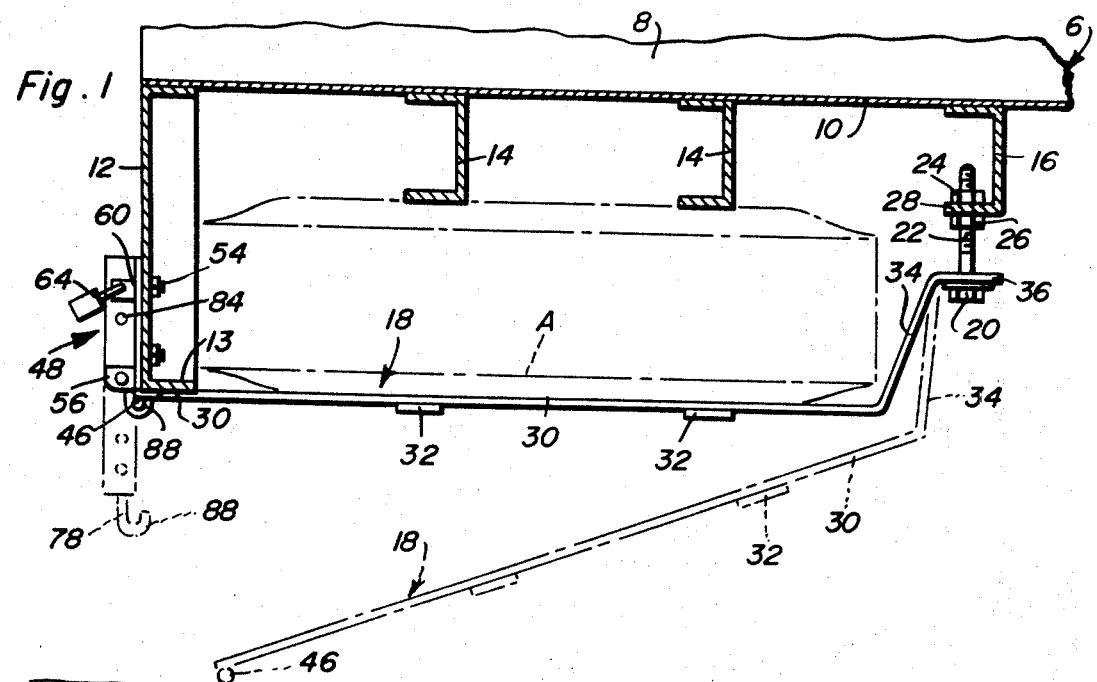
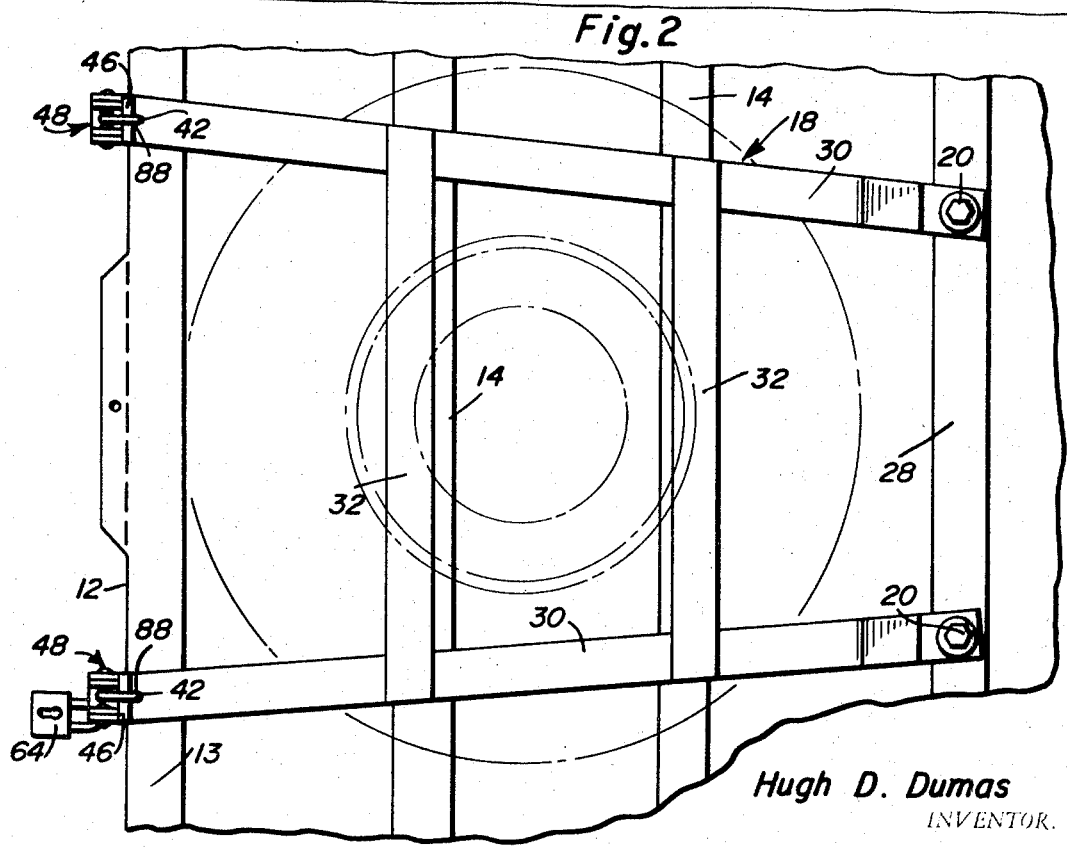

Hugh D. Dumas
INVENTOR.

PICKUP TRUCK SPARE TIRE CARRIER

This invention relates to a heavy duty spare tire carrier which lends itself to use on pickup trucks and camper trailers and has to do with a type of carrier which has been found to be feasible and practical for satisfactory installation underneath the bed or bottom of a box-type body and which has been designed for use with the usual rear bumper in mind.

Users and owners of pickup trucks are aware that spare tire carriers which are provided on present day pickups are in many instances situated in the load space of the box and interfere with hauling campers, livestock, hay, grain, tools and the like. In other instances such carriers are attached in one manner or another under the box and are usually attached with the aid of a long threaded bolt and a wing nut which corrodes and rusts and makes it laborious and difficult to cope with and remove the tire when necessary. In either instance a problem is posed. Accordingly, it is an object of the present invention to provide a tire carrier attachment the use of which has proved out to be an acceptable solution of the problem.

The carrier herein disclosed positions and holds the tire-equipped-wheel firmly up and with reliable certainty against the channel members of the chassis frame ahead of and virtually concealed by the bumper where it can be unlatched from the locale of the bumper and discharged on the surface without having to crawl under the pickup.

Briefly the carrier lends itself to ready and serviceable use on a wheel supported chassis frame structure which is characterized, generally stated, by a horizontal frame, a rear bumper and transversely disposed longitudinally spaced cross member which are embodied in the frame forwardly of the bumper and has coplanar bottom flanges. A box-type body is cooperatively mounted atop the frame and has a bed plate which functions in a well-known manner. The carrier means for the spare tire is such in construction that it can be installed without resorting to other than minimal changes in the frame. It comprises a normally horizontal underslung rack in which the spare tire can be removably cradled and accessibly stored for ready use. Simple bolt and nut means is mounted on one of the cross members and functions to adjustably and hingedly suspend a cooperating forward end of the rack and which permits the rack, when unlatched, to swing down to a rearwardly slanting unloading or loading position. The rack has a rearward end which is freely swingable toward and from the bottom part of the rear bumper. Manually controllable means is carried by the bumper and is adapted to position and retain the rack in its normal storing position.

Tire carriers broadly resembling the type herein disclosed are not, as is known, broadly new. This is to say, many and various types of truck and bus spare tire carriers have been patented. One underslung carrier is shown, for example, in the patent to Charles Wassenfallen, U.S. Pat. No. 1,672,356. While that carrier is designed for use on trucks it was not devised or perfected with the idea that it could be properly installed on a chassis frame having a rear bumper of the type shown.

An object of the present invention is to provide a strong, lightweight spare tire carrier which can be operated from the rear face of the bumper. When the readily accessible finger-operated latches are released the carrier swings down to the ground and permits the tire equipped spare wheel to slide out in readiness for use. To the ends desired the spare wheel is not bolted or attached in any way to the carrier rack or the component parts of the chassis or truck frame. In fact, the tire is squeezed by the yieldable strap members of the rack and inherent tension functions to clampingly hold the tire, that is, once the latches of the toggle-type fasteners are secured in place.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view showing a portion of the box-type body in section, the rear bumper and transverse members of the frame in section and the improved spare tire carrier in elevation and illustrating how the tire is racked and clampingly held.

FIG. 2 is a bottom plan view of the structure appearing in FIG. 1.

Figure 3:
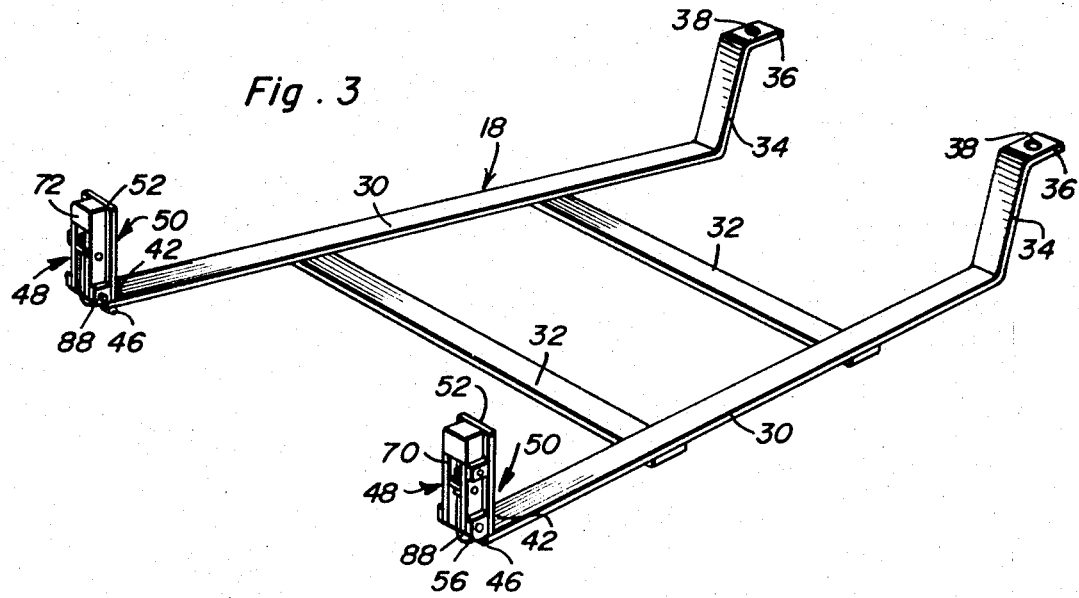
FIG. 3 is a view in perspective of the carrier removed from the truck.

With reference first to FIGS. 1 and 2 and more particularly to FIG. 1 the box-type body of the pickup truck is denoted by the numeral 6, a fragmentary portion of one side wall being denoted at 8 and the bottom or bed plate at 10. The frame of the over-all chassis frame structure (not detailed) embodies the aforementioned horizontally elongated vertically disposed bumper 12 having a bottom flange 13 ahead of which the aforementioned transverse parallel longitudinally spaced frame members 14 are arranged. The frame member to the right in FIG. 1 is designated and differentiated by the numeral 16 and it is this particular frame member which serves to hang and support the novel openwork spare tire rack 18. The hanger means for the rack comprises a pair of simple bolts 20 (FIG. 1) whose threaded shank portions 22 are mounted and adjustably retained by assembling nuts 24 and 26 on the horizontal flange 28. It should be noted in this connection that all of the horizontal bottom flanges of the frame members 14 and 16 are in a common plane above the plane of the aforementioned rear bumper flange 13.

That part of the carrier which is designated as the rack 18 is made up of simple flat faced strap members; namely a pair of coplanar longitudinal strap members 30 and transverse companion spaced parallel interconnecting strap members 32. The forward end portions of these strap members 30 are bent up at an oblique angle as at 34 and terminate in horizontal end portions 36 having bolt holes 38 to accommodate the aforementioned anchor bolts 20. The construction is such that the members 36 are detachable, adjustable and hinged.

The free rearward and terminal end portions of the longitudinal strap members 30 are denoted at 40 (FIG. 4), each member being provided with a hole which provides a keeper 42. The terminal portion 44 is provided with a fixed transversely disposed dowel or the like 46 which is close to and cooperates with the keeper hole 42.

Figure 4:
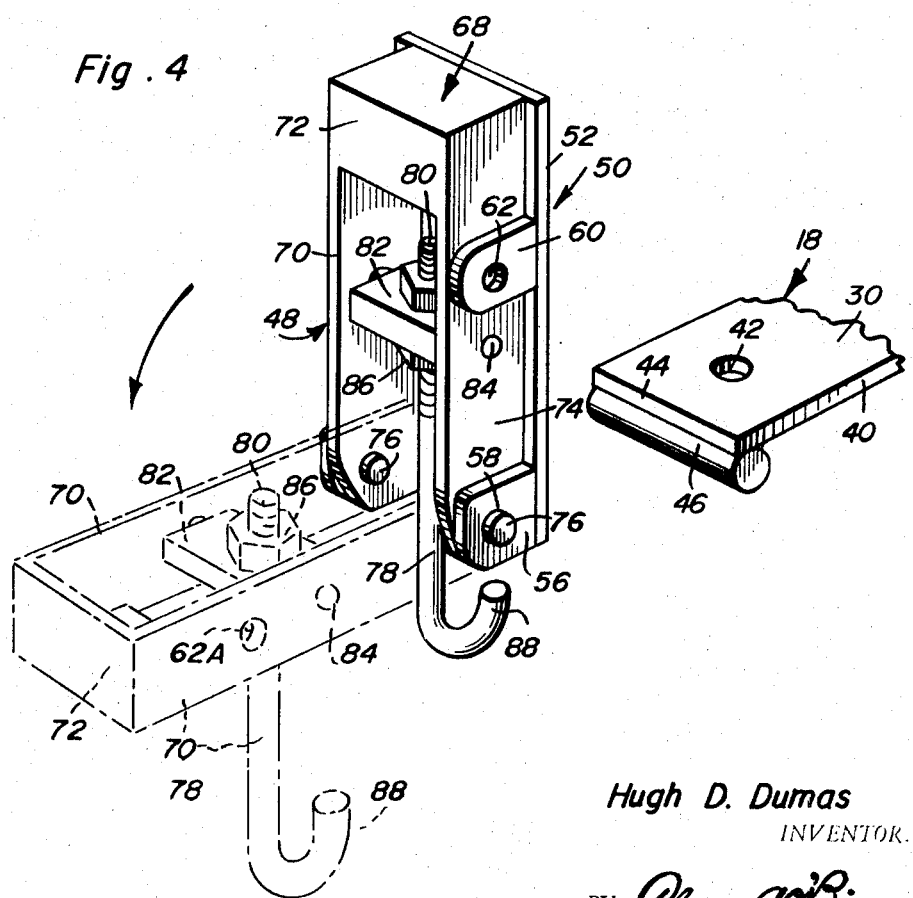
FIG. 4 is a view in perspective with parts in elevation and phantom lines and detailing one of the adapter brackets and the toggle-type fastener means and end portion of one of the strap members of the rack.

The features 40–46, inclusive, serve to accommodate the aforementioned toggle-type fastening devices 48 (FIG. 4). Each device is properly positioned and supported by an adapter bracket 50 comprising a substantially rectangular plate 52 which is bolted or otherwise secured to the rear side of the rear bumper as denoted at 54 (FIG. 1). The lower part of the plate is provided with a pair of spaced parallel rearwardly extending ears 56 having bearing holes 58 therein. One edge portion of the plate is provided with a suitable lug 60 having a hole 62 therein to accommodate the shackle of an attachable and detachable padlock or equivalent safeguarding and fastening means denoted generally by the numeral 64 (FIGS. 1 and 2). The toggle device comprises a yoke 68 having a pair of spaced parallel arms or limbs 70 connected together at their normal upper ends as at 72. The lower end portions 74 of these arms are positioned between the ears 56 and are provided with integral outstanding studs which constitute journals 76 and are rotatable in bearings 58. One of the arms is provided with a hole 62A (FIG. 4) which is aligned with an aforementioned hole 62 to accommodate the shackle of the padlock when the fastening devices are in the full line positions illustrated in the drawings. In addition to the yoke 68 the toggle embodies a J-shaped bolt 78 whose shank portion 80 is passed through a hole provided in a cleat 82 which is arranged between the arms and is pivotally mounted as at 84 so that it is substantially self-levelling in operation. The upper threaded end of the shank of the bolt is held in place by assembling and retaining nuts 86. The bill portion 88 at the lower end of the bolt constitutes a detent which is retentively cooperable with the dowel 46 and the keeper hole 42 in the manner illustrated in FIGS. 1, 2 and 3.

When the latch, that is the J-shaped bolt 78, is in its normal latching position it is retained within the confines of the yoke 48 by its over-center positioning, see FIG. 1, and the yoke 48 may be locked in its corresponding position by the shackle of the padlock 64 or other equivalent fastening means (not shown) in order to prevent unauthorized removal of the tire A. On the other hand by removing the padlock it is then an easy matter to place the finger on the yoke and swing it out and down to the dotted line position shown in FIG. 4 and then finally to the depending position shown in FIG. 1 in phantom lines. It follows that with this latch-equipped toggle-type over-center fastening means mounted on the adapter bracket and with the adapter bracket bolted on the bumper, the strap members 30 of the rack 18 can be held in the carrier position illustrated in FIGS. 1 and 2. Inasmuch as the strap members 30 and 32 are resilient it will be evident that when the rack is properly fastened and adjusted the tire A is responsively squeezed and securely clamped between the rack and the bottom flanges on the frame members 14, as brought out in FIG. 1 and therefore that tension is maintained on the over-center latch means to insure that the tire A will be supported in a secure fashion until such time as the yoke 48 is swung rearwardly and downwardly from the solid line position thereof illustrated in FIG. 1 of the drawings.

It is submitted that the manner in which the spare tire carrier is constructed, mounted, and used will be evident from the specification and views of the drawing. Accordingly, a more extended description is thought to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

1. In combination, a vehicle chassis characterized by frame structure embodying a frame, a rear bumper and longitudinally spaced transversely disposed cross-members supported forwardly of said bumper and having coplanar bottom flanges, a box-type body having a bed plate supported atop said frame, carrier means for a spare tire embodying a normally horizontally underslung rack in which said spare tire can be removably cradled and accessibly stored for ready use, means mounted on one of said cross-members hingedly suspending a forward end of said rack and permitting the rack to assume a rearwardly downwardly slanting tire unloading position, said rack having a rearward end which is freely swingable toward and from a bottom part of said rear bumper, and manually controllable means carried by said bumper and adapted to position and retain said rack in its normal racking and storing position, each manually controllable means comprising an adapter bracket which is accessibly mounted on a rear surface of said bumper, a toggle-type fastener comprising a U-shaped yoke pivotally mounted on said bracket, and a J-shaped latch pivotally and adjustably mounted on and cooperable with the arms of said yoke.

2. A spare tire carrier comprising a rack embodying a pair of coplanar duplicate elongated strap members having forward ends which are laterally bent, apertured and provided with nut equipped bolt means whereby said ends may be attached to and hung from a frame member, said strap members being provided with rear end portions, each end portion having an opening therein providing a keeper hole, said rack also embodying a pair of transverse longitudinally spaced strap members joined to and interconnecting median portions of the longitudinal strap members, and a fastening device for the rear end of each longitudinal strap member, said fastening device comprising an adapter bracket which is adapted to be bolted on the rear vertical face of a pickup bumper, said bracket provided with a pair of ears, and a toggle-type fastener embodying a yoke having arms with lower ends which are hingedly mounted between the respective ears.

3. The carrier defined in and according to claim 2 and wherein said fastening device also embodies a J-shaped bolt having a hooked bill portion which is releasably engageable with said keeper hole and has a threaded shank portion, and a cleat pivotally mounted between the median portions of the arms of said yoke, said cleat having a hole therein, the shank portion passing through said hole and being adjustably fastened to said cleat by complemental assembling and retaining nuts.

4. The carrier defined in and according to claim 3 and wherein said adapter bracket has a median part of a plate portion provided with a rearwardly extending lug, said lug having a hole therein normally aligned with a complemental hole provided therefor in a cooperating one of the arms of said yoke, said holes adapted to accommodate a padlock or the like.

* * * * *